INVENTOR.
BURNELL N. ROBBINS

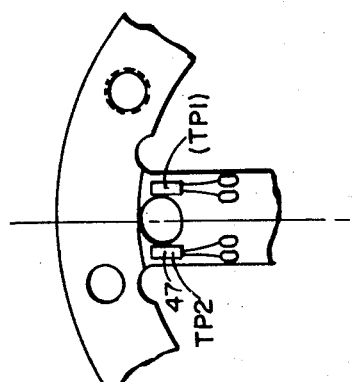
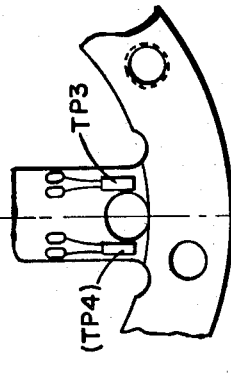
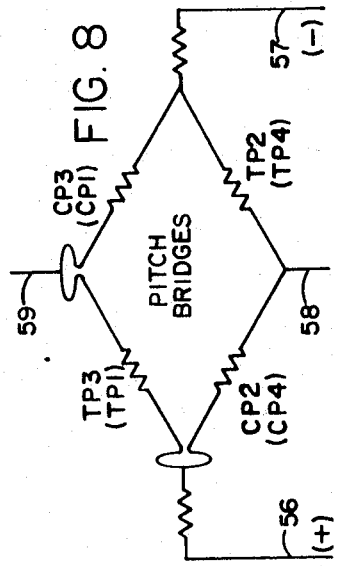
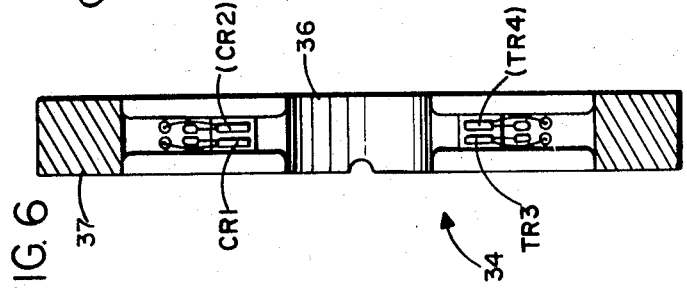
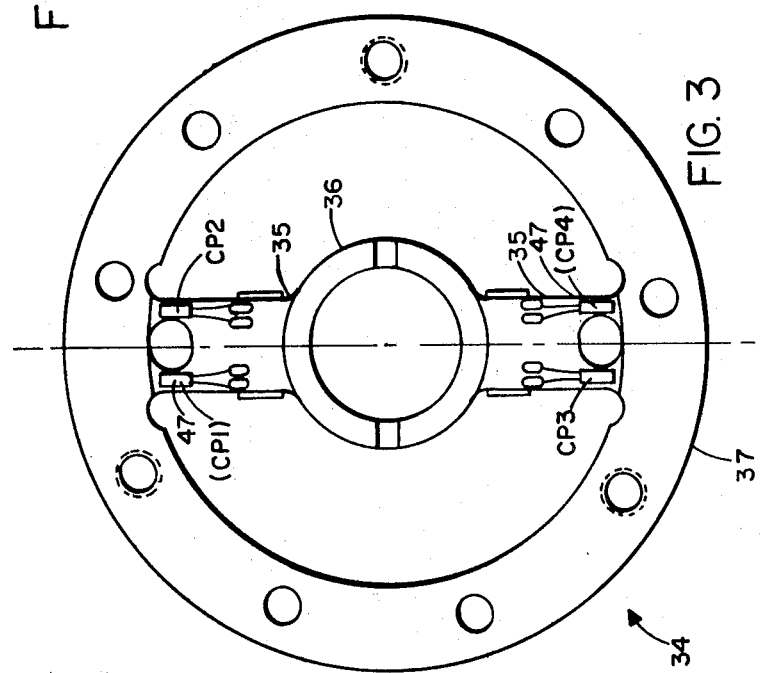
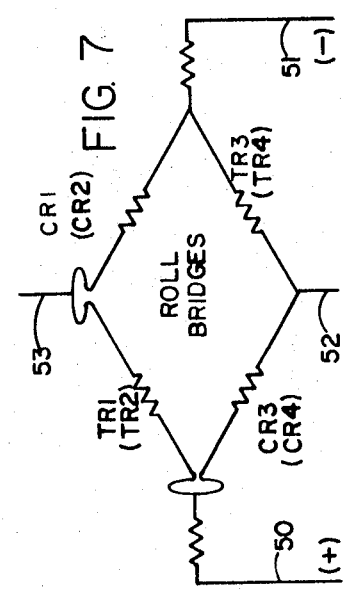
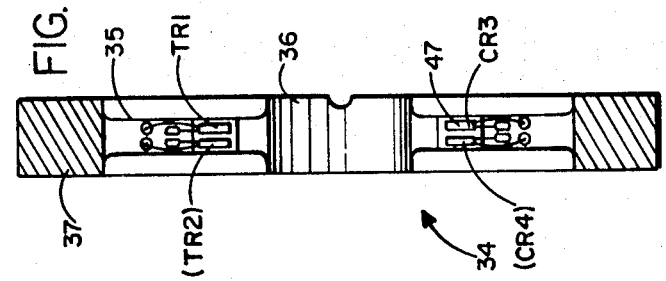

United States Patent Office 3,620,073
Patented Nov. 16, 1971

3,620,073
CONTROL WHEEL FORCE STEERING APPARATUS
Burnell N. Robbins, Minneapolis, Minn., assignor to
Honeywell Inc., Minneapolis, Minn.
Filed Sept. 18, 1968, Ser. No. 760,469
Int. Cl. G01l *3/00;* G05g *1/04;* B64c *13/04*
U.S. Cl. 73—133
4 Claims

ABSTRACT OF THE DISCLOSURE

A control wheel force transducer for controlling through an automatic pilot an aircraft in pitch and roll by suitable signals, develops such signals by the use of strain gages or the like incorporated or mounted on a deformable member which is deflected from a normal position on control wheel movement in one direction to supply or generate roll control signals and is deflected on control wheel movement in a second direction at an angle to the first direction to supply or generate pitch control signals.

SUMMARY OF THE INVENTION

Aircraft control wheel force transducers or aircraft control stick force transducers have been heretofore provided wherein electrical signals for controlling the craft about the roll or pitch axis have been developed upon the application of forces to the control wheel or control stick. Examples of such prior arrangements are disclosed in U.S. Pats. 2,952,426, Sept. 13, 1960; 3,114,124, Dec. 10, 1963; and 3,304,799, Feb. 21, 1967. Such arrangements generally include a deformable member, having limited relative movement for providing control signals, between the control wheel or control stick and a member connected to the primary control apparatus operating control surfaces for the aircraft, which primary apparatus may be operated manually for direct manual control after the limited movement of the deformable member is exceeded.

Featured in the present arrangement of a control wheel force transducer is a deformable member having a central portion thereof supported on a axis common with that of the control wheel. Limited relative movement either rotational or axial is permitted between the control wheel and central portion upon application of force to the wheel. Such relative movement is applied to elements arranged as strain gages on the deformable member, and the strain gages are so connected as to serve to develop electrical signals in accordance with the magnitude and the direction of the applied force to the control wheel.

Stop means are provided between the control wheel and member to limit the relative axial and rotational movements and thus to limit the compression and tension in the strain gages to limit the magnitude of the signals generated. The stop means thus also serve to limit the strain applied to the deformable member before direct manual control is also applied to the primary control system of the aircraft.

BRIEF DESCRIPTION OF THE DRAWINGS

Subsequently, details of the invention will be described in connection with the following figures wherein;

FIG. 3 shows the arrangement of the strain gages on the rear face of the deformable member of FIG. 2 with its axis perpendicular to the paper;

FIG. 4 shows an arrangement of the strain gages on the front face of the deformable member or the face toward the pilot;

FIG. 5 shows an arrangement of the strain gages on the right side of the deformable member of FIG. 2;

FIG. 6 shows the arrangement of the strain gages on the left side of the deformable member of FIG. 2;

FIG. 7 shows the strain gages arranged in a Wheatstone bridge for developing signals in accordance with change in position of the control wheel about one axis;

FIG. 8 shows an arrangement of the strain gages in a Wheatstone bridge to provide electrical signals in accordance with movement of the control wheel involving a second axis.

DESCRIPTION OF THE EMBODIMENTS

Figure 1:
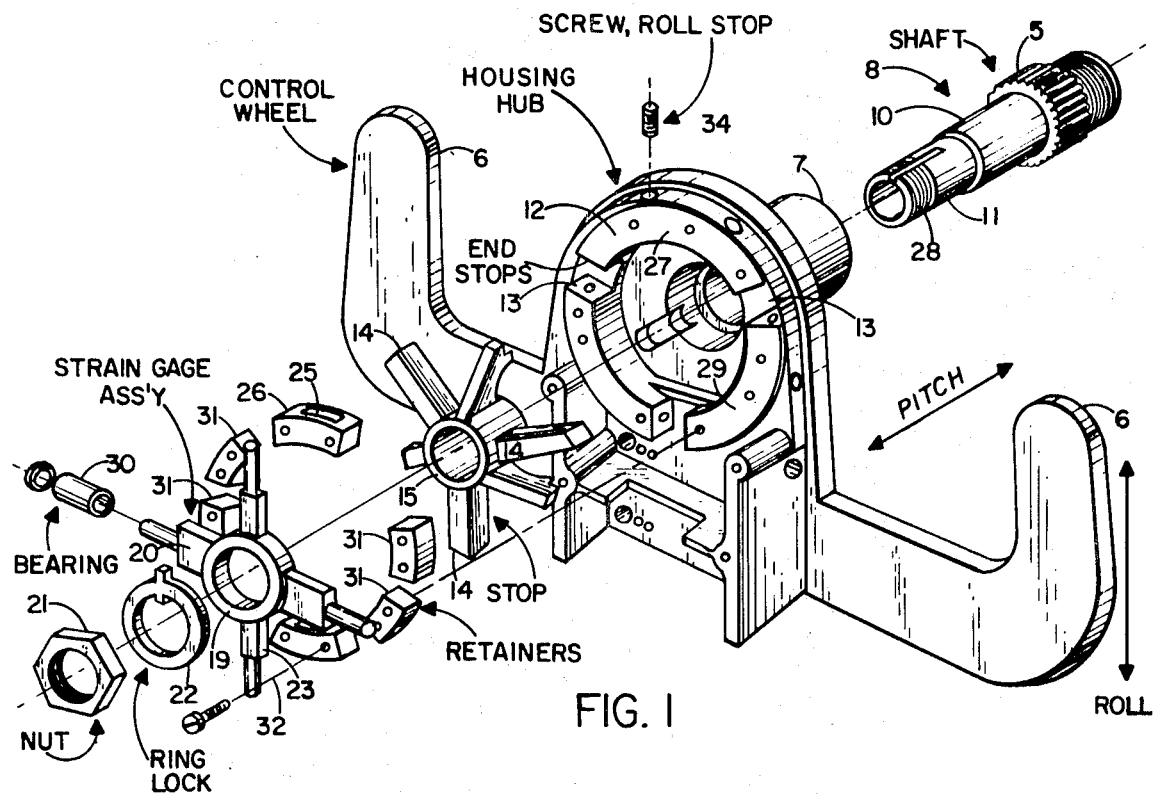
FIG. 1 shows in an exploded view primarily mechanical details of one embodiment of the invention.

Referring to FIG. 1 which shows in exploded view primarily mechanical details of one embodiment, a shaft 8 has splines 5 thereon which engage the splines of a pulley (not shown) which pulley receives the roll control cables of the primary control system of the aircraft. Thus the shaft 8 is fixed relative to the pulley. Shaft 8 has a portion 10 that receives the hub 7 of a control wheel 6 for relative axial and rotational movement of handwheel 6 and shaft 8. The hub 7 includes an enlarged portion 12 having axial notches 13 to limit rotational movement of wheel 6.

These notches receive radial arms 14 of a spider member 15. Axially adjacent member 15 is a cross shaped member 19 having four deformable radial arms respectively at right angles, two of the arms 20, 20 shown horizontally being alike and two other arms 23, 23 shown vertically being alike but dissimilar from arms 20. Adjacent member 19 is a lock ring 22 and lastly is a nut 21. In assembled relationship, the hub 7 is axially and rotationally loose on portion 10 of shaft 8. The spider member 15 is received on portion 11 of shaft 8 in locking relation axially and rotationally thereto. The cross member 19 is received in locking relationship relative to member 15, and the lock ring 22 is received in locking relation rotationally on threaded portion 28 of the shaft 8. The nut 21 is then threaded on portion 28.

Deformable arms 23 of cross member 19 are received in peripheral openings or slots 25 of member 26 which member is bolted to the slotted face of member 12 in area 27. Similarly, the arms 20 have their ends shaped to receive suitable bearings 30. The ends with the bearings mounted are received in operable relation between members 31 that are bolted to the slotted face of portion 12 in area 29, as indicated by the construction line 32.

Suitable spaced peripheral threaded openings are provided in member 12 that receive stop screws 34, one of which is shown, that engage the radial arms 14 in slots 13 to adjust the allowable relative rotational movements between handwheel 6 and shaft 8 thus between the deformable arms of cross member 19 and the central or hub portion of the cross member 19.

Suitable stop means are provided also between handwheel 6 to limit the permissible relative axial movement and deformation of arms 23 between the handwheel 6 and thus between member 12 and the central portion or hub of the cross member 19.

It thus will be evident that the axis of control wheel 6 and the axis of shaft 8, the deformable cross member 19, and spider member 15 correspond.

In FIG. 1, the vertical arms 23, 23 of cross member 19, as will be shown, have secured on the forward and rearward faces thereof at equal radii suitable strain elements for providing aircraft pitch axis control signals as also will be subsequently described. Similarly, the laterally extending arms 20, 20 of the deformable member 19 have secured on their opposite edges at the same radii suitable strain elements for developing roll control signals as will be hereinafter considered in connection with the embodiments of FIG. 2. Thus the roll sensing strain elements on arms 20 are in planes at right angles to the planes containing the strain elements on arms 23 for providing the pitch control wheel force signals. The strain gages 47 are similarly mounted with respect to the shaft axis and the plane of neutral axes of spokes 35.

Figure 2:
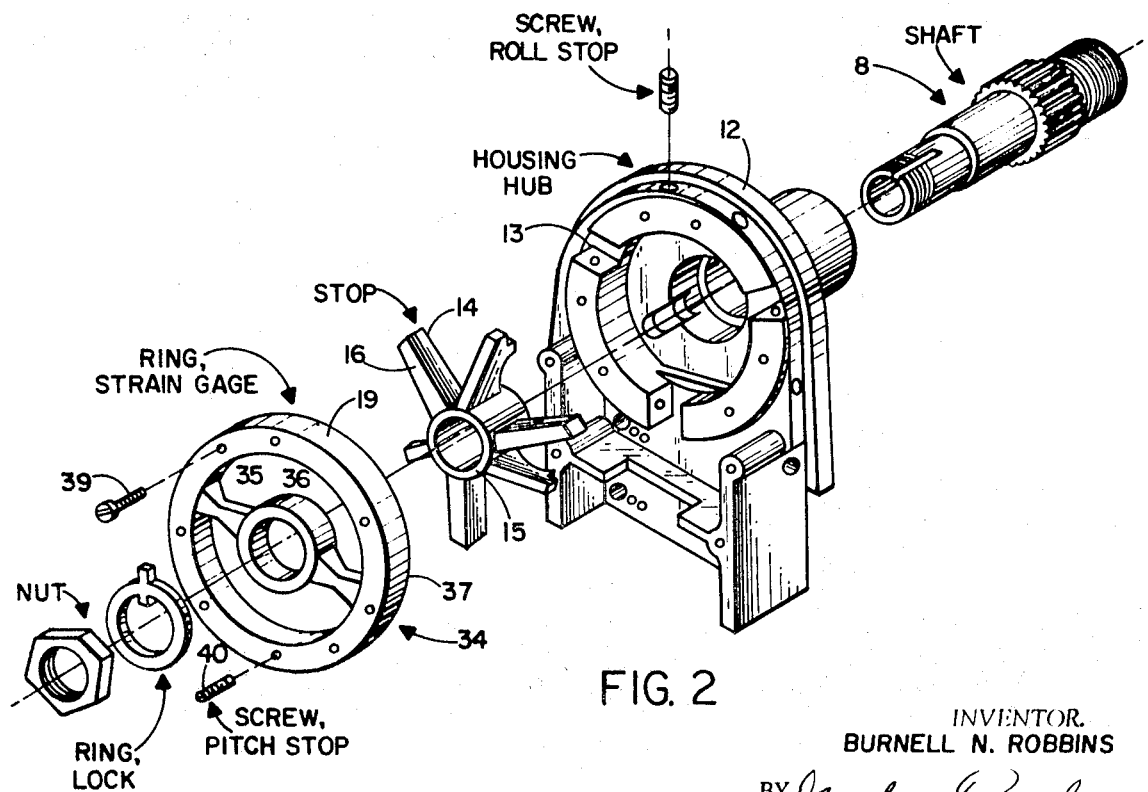
FIG. 2 shows in an exploded view mechanical details primarily of a second embodiment of the invention.

The arrangement of FIG. 2 is similar to the embodiment in FIG. 1, except that the strain gage assembly of FIG. 1 comprising the deformable arms of cross member 19 is replaced by a strain gage ring 34 having a hub or central portion 36 that is coaxial with the handwheel operated member 12. The central portion 36 has plural radial arms or spokes 35 extending to a circular peripheral portion 37. The peripheral portion of the strain gage ring 34 is mounted to a face of member 12 by suitable fastening screws 39, one of which is illustrated. When assembled ring 34 is relatively integral with spider 15.

Also, passing through a threaded opening in peripheral portion 37 is a stop screw 40 which is suitably located to engage a face of one of the arms 14 of member 15 to limit relative axial movement of peripheral portion 37 by movement of control wheel operated member 12 relative to the shaft 8, in one direction and similarly suitable stop means are provided to limit opposite relative axial movement of peripheral portion 37 of ring member 34 along with control wheel operated member 12 relative to shaft 8. To provide the proper axial and tangential freedoms within the housing 12 to provide the transducer signals a special bearing is utilized. A standard ball bearing is modified to have not only the normal radial action but also axial freedom. The axial movement can be as great as .080 inch. The bearing is protected internally and externally against environmental contaminates.

The arrangements for developing the aircraft pitch control signals in the control wheel force sensor in the embodiment of FIG. 2 will be considered with respect to FIGS. 3 and 4.

In FIG. 3, the strain gage ring 34 again has its peripheral portion 37, its radial spoke members 35, 35 and its central portion or hub 36. For the purpose of generating control signals, strain gage elements 47 of suitable material are mounted or cemented on the front face and the rear face of spoke members 35, 35. These gage elements 47 as shown are located near the junction of the spoke members 35 and the peripheral portion 37. These elements are lengthened or shortened and the strain effect or signals are for developing the electrical pitch control signals upon departure of spokes 35 from a normal position.

The strain gage elements 47 have been heretofore used for developing electrical control signals, see for example the U.S. Pat. 3,304,799 to Menefee, which shows the conventional strain gage strips 12 therein. Such strain gage elements herein are mounted on the spoke elements 35, 35 and develop control signals, when suitably arranged, and deformation in tension (lengthening) and compression (shortening) is applied to the spoke members 35, 35. FIG. 3 shows four strain gage elements 47 mounted to one face of spokes 35, 35, FIG. 4 shows the strain gage elements 47 applied to the rear or opposite face of spokes 35, 35.

In connection with the notation applied to the individual strain gage elements 47, the term T as to the state of an element means tension; C means compression; as to the aircraft axis controlled P means pitch; R means roll. In connection with FIGS. 7 and 8 the arrangement of the strain gage elements 47 on the faces of spokes 35, 35 of the strain gage ring 34 provide two sources of pitch control signals and thus provide redundant pitch signal sources. One signal source is termed the A bridge. The other pitch signal source is termed the B bridge. Gages in parentheses indicate A bridge; gages not in parentheses indicate B bridge. The strain gage ring 34 is mounted so that the spokes 35 thereof are in planes at right angles to the axis of shaft 8, and thus in the direction of the craft lateral axis.

FIG. 5 shows the strain gage ring 34 in cross-section with the peripheral ring 37, the spoke members 35 and hub or central portion 36. Four strain gage elements TR1, (TR2), CR3, (CR4), are fastened to the sides of the spoke members 35, 35 as shown.

FIG. 6 also shows the strain gage ring 34 in section, and shows the peripheral ring 37 in section, the spoke members 35, 35, and the hub 36. Fastened to the opposite faces of the spokes 35, 35 from that shown in FIG. 5 are the strain gage elements CR1, (CR2), TR3, and (TR4), in the position shown.

It will be apparent from the above-indicated position of the strain gage elements 47 on the faces of spoke members 35 of strain gage 34, as illustrated in FIGS. 3–6, that FIGS. 3 and 4 provide the pitch control signals for axial movement of control wheel 6 and FIGS. 5 and 6 provide the roll control signals for rotational movement of control wheel 6.

It will also be evident from FIGS. 3 and 4, with the face of strain gage ring 34 in FIG. 3 away from the pilot and the face of strain gage ring 34 in FIG. 4 toward the pilot, that if the pilot pushes the control wheel 6 away from him, the gages of the spokes 35, 35 in FIG. 3 will both be compressed as the letter C indicates; however, the strain gage elements 47 of the faces of spokes 35, 35 in FIG. 4 are under tension as the letter T indicates in the designation of these strain gage elements. The strain gage elements bend in the direction that the spokes 35 bend.

Also with respect to FIGS. 5 and 6, the strain gage elements TR1, (TR2), CR3, and (CR4) of FIG. 5 may be considered as being on the right side of spokes 35, 35 when the strain gage ring 34 is with the spokes viewed as in FIG. 4. The strain gage elements CR1, (CR2), TR3, and (TR4) are on the left sides of spokes 35, 35 as the spokes are viewed in FIG. 3.

If a counterclockwise rotation or force be applied by the pilot to the control wheel 6, it is evident that the right side of upper spoke 35 shown in FIG. 5 is under tension and the left side of this upper spoke is under compression. Also with respect to the lower spoke in FIG. 5, the left side is under tension and the right side is under compression. This is consistent with the designation of the letters T and C to the strain gage elements in FIG. 5. Similarly, applying force counterclockwise while facing control wheel 6 with the left side of upper spoke 35 under compression and the left side of lower spoke 35 in FIG. 3 under tension, this corresponds with the designation C and T to the strain gage elements in FIG. 6.

Continuing to FIGS. 7 and 8, the strain gage elements are arranged in a Wheatstone arrangement. FIG. 7 as stated, supplies the aircraft roll channel control signals, and FIG. 8 provides the aircraft pitch channel control signals. In FIG. 7, each of the two Wheatstone bridges indicated consists of an arrangement of strain gages or equivalent electrical device for detecting bending, two of which are under compression and two of which are under tension, thus one Wheatstone bridge consists of strain gage elements TR1, CR3, CR1 and TR3. The other Wheatstone bridge for supplying roll signals comprises strain gage elements (TR2), (CR4), (CR2), and (TR4). The signals from the two roll control channel Wheatstone bridges are supplied to conventional autopilot circuitry with which the force transducer is associated which autopilot translates the signals into the desired operation of the roll attitude control means such as aileron surfaces. Similarly, in FIG. 8 which shows the two Wheatstone bridges for supplying aircraft pitch attitude control signals, one Wheatstone bridge consists of strain gage elements CP2, CP3, TP2, TP3. Similarly a second Wheatstone bridge for the pitch channel comprises strain gage elements (CP1), (CP4), (TP2), (TP3). In FIG. 7, as conventional, two points of a diagonal or terminals of one of the roll Wheatstone bridges is connected through conductors 50, 51 to a source of supply voltage and the output of the conductor is taken across an opposite diagonal by means of conductors 52, 53. Similar conductors may be provided for the second roll axis Wheatstone bridge. In FIG. 8, one pitch channel Wheatstone bridge has opposite points of a diagonal connected to a source of supply voltage through conductors 56, 57 and the opposite diagonal of the Wheatstone bridge is connected by conductors 58, 59 to supply the control signal to the autopilot. A similar set of conductors may be provided for the second pitch channel Wheatstone bridge.

Ideally, a concentric push or pull on the control wheel 6 should produce only a pitch control signal and not a roll control signal. However, in practice, with strain gages mounted at equal radii from the center of the strain gage ring as herein, this is not the case. A look at FIG. 5 or 6, while a push or pull is applied by the pilot to the control wheel would indicate an action on the roll strain gages as well as on the pitch strain gages 47, since the roll gages which are at the same radii are consequently not on the plane of neutral axes of the spoke 35. Because of such mounting arrangements, a roll gage may be compressed while its adjacent gage at the same radius but on the opposite side of the plane of neutral axes for axial forces is lengthened or being tensioned while a pitch or pull is applied to wheel 6. Therefore, also an unwanted roll control signal could result when only a pitch signal is commanded. To minimize such cross-coupling from pitch to roll, and viewing the sides of the spokes 35 as in FIGS. 5 and 6 with respect to the plane of neutral axes of the spokes for a pitch command on the control wheel, the four gages on the same side of the plane of neutral axes are connected to form a roll channel bridge in such manner as shown in FIG. 7.

There is similarly a cross-coupling from a roll force into pitch which is due to the fact that in FIG. 3 for example, the strain gages (CP1), CP2, CP3, (CP4) being at the same radii are not mounted on the plane of neutral axes for tangential forces for spokes 35, 35 but are mounted instead on opposite sides of said plane which is likewise true of gages TP2, (TP1), (TP4), TP3 of FIG. 4. The gages for providing the pitch channel signals therefore are arranged as in FIG. 8 to minimize the cross-coupling effect from roll to pitch.

A third factor for which compensation is provided is the result of applying an eccentric force rather than a concentric force axially to control wheel 6, such as when the pilot pushes on the wheel 6 with only one hand. An off-center resultant axial force on the left-side of control wheel 6 and adjacent one spoke 35 causes from FIG. 4, tension action at gages TP2, (TP1), and a compressive action on (CP1), CP2 on the rear side of spoke 35. Similarly, gages TP3, (TP4) receive a compressive action and gages CP3, (CP4), a tensioning action.

The unwanted pitch moment due to a resultant nonaxial push or pull force on control wheel 6 is minimized by arranging the strain gages so that in the pitch bridge configuration a pair of gages 47 receiving like unwanted effects (tension or compression) are placed adjacent each other rather than opposite each other in the bridge, while for obtaining a desired signal gages 47 receiving like effects are placed opposite each other in the bridge.

A fourth factor is when cross-coupling occurs in the roll channel due to unlike tangential forces rather than like tangential forces being applied to the wheel 6. Thus if the resultant moment on one side of the axis of wheel 6, in absolute quantity, is unequal to the moment on the opposite side of the axis, an eccentric tangential force is said to be applied to the control wheel 6. This unwanted roll effect on the roll signal bridges due to the eccentric moment applied to the wheel is similarly corrected by the arrangement of the strain gage elements 47 in FIG. 7.

A fifth factor for which compensation is provided is the output or cross-coupling from like channels must have same polarity to minimize the algebraic difference between the like channels. This compensation is accomplished by connecting the gages in configurations as shown in FIGS. 7 and 8. From FIG. 7, for example, two roll channel signal generating bridges are provided. One includes gages TR1, TR3, CR1, CR3. The other includes (TR2), (TR4), (CR2), (CR4). A meter such as volt meter may be connected between conductor 53 and a similar conductor for the other bridge. Thus if the two conductors have like polarity cross-coupling signals, the algebraic difference is minimized. However, if the conductors have unlike polarity the tracking error is maximized and if it reaches a predetermined magnitude, input conductors 50, 51 may be disconnected from their supply.

With respect to the force sensor or strain gage ring 34 it may be made of suitable material such as aluminum with spoke members 35 provided so that flexure occurs in the spokes upon the application of force to the peripheral member 37 while movement of the hub 36 is restrained. Such movement may be either in an axial direction or in a rotational direction. The strain gage elements 47 may be cemented to the spoke members 35 so as to respond to the bending or deformation of spokes 35 and provide an electrical output in the pitch and roll Wheatstone bridges.

With respect to other details, it is evident that the pitch control force limit stop screw 40, FIG. 2, must be in alignment with the face 16 of a radial extending member 14 on spider member 15 to function properly. Similarly, the roll stop screw is arranged in the periphery of member 12 to engage an edge of the radial member 14 on spider member 15. It will be understood that through the stop screw arrangements for limiting axial and tangential or rotational movements that the periphery 37 of ring 34 is moved only a small distance such as a few thousandths of an inch relative to the hub member 36 to supply control signals and that such signals are proportional to the force applied to the control wheel and thus to the periphery 37.

With respect to FIG. 2, it will now be evident that ring member 34 and spider member 15 with radial arms 14 are made fast or integral with shaft 8 whereas the control wheel member 12 may be moved axially or tangentially relative to shaft 8 with such movements for example, tangentially limited by the engagement of the roll stop screw with the side of radial stop 14 on spider member 15 and any further tangential or rotational movement of the control wheel member 12 will result in direct manual operation of the shaft 8 and primary control system with no increase in the control wheel force electrical signal.

The electrical signal, as stated, is supplied to the conventional autopilot which for tangential movements, of the control wheel reflects operation of the aileron surfaces of the aircraft to control roll attitude. Similarly, movement of the control wheel away from the pilot results in the pitch stop screw 40 ultimately engaging a face 16 of radial stop 14 on member 15 to limit the magnitude of the pitch control wheel force signal. Thereafter further application of force with the stop screw 40 engaged with face 16 of radial stop 14 results in direct manual control of the elevator surfaces.

While the invention has been described and illustrated in detail, it is to be understood modifications may be made therein without departing from the spirit and scope of the invention as expressed in the appended claims.

What is claimed as new is:

1. Control wheel force steering apparatus which comprises: a shaft; a member having a hub or central portion connected in locking relation to said shaft; a manually operable control wheel positioned concentric with said shaft; a plural deformable members fastened to and extending radially from said hub and connected in locking relation to said control wheel, each of said deformable members experiencing compression on one side and tension on the other side of a first plane of neutral axes, in response to axial forces applied to said control wheel and further experiencing compression on one side and tension on the other side of a second plane of neutral axes in response to tangential forces applied to said control wheel, said first and second planes being substantially perpendicular to one another; a first pair of strain gauge elements located on one side of said second plane and on opposite sides of said deformable elements and a second pair of strain gauge elements located on one side of said second plane and on opposite sides of said first plane on another of said deformable elements, said strain gauge elements being connected in a Wheatstone bridge in a manner which senses axial forces applied to said wheel but which is insensitive to tangential forces; a third pair of strain gauge elements located on one side of said first plane and on opposite sides of said second plane, on one of said deformable element, and a fourth pair of strain gauge resistors located on the same side of said first plane and on opposite sides of said second plane on another of said deformable elements, said third and fourth pairs of strain gauge elements being connected in a Wheatstone bridge in a manner which senses tangential forces applied to said control wheel but which is insensitive to axial forces.

2. The apparatus of claim 1 further comprising mechanical, condition control actuating means connected to said shaft.

3. The apparatus of claim 2, and adjustable stop means to limit the relative movement of said control wheel and shaft to limit the magnitude of output signal of said bridge.

4. The apparatus of claim 1, wherein the strain gage elements are secured at equal radii to the radial members.

References Cited
UNITED STATES PATENTS

| | | | |
|---|---|---|---|
| 2,754,465 | 7/1956 | Brier | 318—488 |
| 2,403,952 | 7/1946 | Ruge | 73—136 |
| 2,952,426 | 9/1960 | Uisser | 244—83 |
| 3,114,124 | 12/1963 | Miller | 336—30 |
| 3,304,799 | 2/1967 | Menefee | 74—519 |
| 3,365,689 | 1/1968 | Kutsay | 338—5 |
| 3,427,875 | 2/1969 | Saxl | 73—141 |

RICHARD C. QUEISSER, Primary Examiner

J. J. WHALEN, Assistant Examiner

U.S. Cl. X.R.

74—519; 244—83

UNITED STATES PATENT OFFICE
CERTIFICATE OF CORRECTION

Patent No. 3,620,073            Dated November 16, 1971

Inventor(s) Burnell N. Robbins

It is certified that error appears in the above-identified patent and that said Letters Patent are hereby corrected as shown below:

Column 6, line 66, after "shaft;" delete --a--.

Signed and sealed this 25th day of April 1972.

(SEAL)
Attest:

EDWARD M. FLETCHER, JR.          ROBERT GOTTSCHALK
Attesting Officer                Commissioner of Patents